(12) United States Patent  (10) Patent No.: US 9,246,530 B1
Orlovsky et al.  (45) Date of Patent: Jan. 26, 2016

(54) BUILT-IN TEST SYSTEM AND METHOD

(71) Applicant: Texas Instruments Incorporated, Dallas, TX (US)

(72) Inventors: Michael Orlovsky, Rehovot (IL); Eran Nussbaum, Herzelia (IL); Asaf Even-Chen, Tel-Aviv (IL); Roy Beeri, Tel-Aviv (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/588,034

(22) Filed: Dec. 31, 2014

(51) Int. Cl.
*H04B 3/36* (2006.01)
*H04B 17/00* (2015.01)
*H04Q 1/20* (2006.01)
*H04B 1/3816* (2015.01)
*H04B 1/40* (2015.01)
*H04B 1/04* (2006.01)

(52) U.S. Cl.
CPC ............... *H04B 1/3816* (2013.01); *H04B 1/40* (2013.01); *H04B 17/00* (2013.01); *H04B 2001/0416* (2013.01)

(58) Field of Classification Search
CPC ........ H04B 1/3816; H04B 1/40; H04B 17/00; H04B 2001/0416; H04B 1/3818; H04B 17/10; H04B 17/11; H04B 17/20; H04B 17/21
USPC .......................... 375/224, 219, 220, 221, 222
See application file for complete search history.

(56) References Cited

U.S. PATENT DOCUMENTS

| | | | | |
|---|---|---|---|---|
| 4,794,325 A * | 12/1988 | Britton | .................. | G10R 35/04 324/74 |
| 2009/0034651 A1* | 2/2009 | Lan | ........................ | H04L 25/061 375/296 |
| 2009/0227214 A1* | 9/2009 | Georgantas | .............. | H04B 1/30 455/86 |
| 2012/0126980 A1* | 5/2012 | Zhao | ...................... | G08B 29/14 340/554 |

* cited by examiner

*Primary Examiner* — Phuong Phu
(74) *Attorney, Agent, or Firm* — Lawrence J. Bassuk; Frank D. Cimino

(57) ABSTRACT

A communication device includes a DC input component, a transmitting component an envelope detecting component, a receiving component, a storage component and a comparator. The DC input component generates a first direct current signal and a second direct current signal. The transmitting component generates a first transmitted signal based on the first direct current signal and a second transmitted signal based on the second direct current signal. The envelope detecting component generates a first envelope signal based on the first transmitted signal and generates a second envelope signal based on the second transmitted signal. The receiving component generates a first received signal based on the first envelope signal and a second received signal based on the second envelope signal. The storage component has a priori information stored therein. The comparator outputs a correlation signal based on the first received signal, the second received signal and the a priori information.

20 Claims, 7 Drawing Sheets

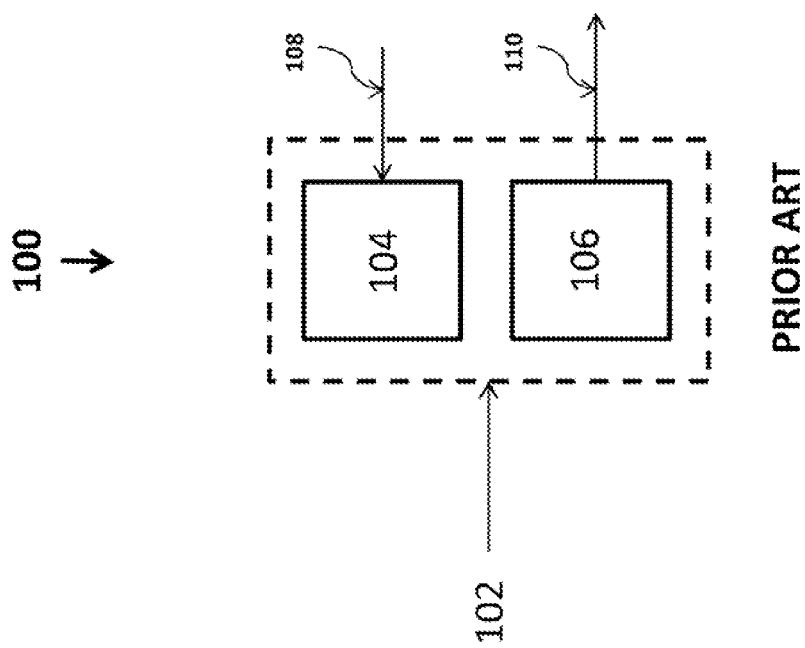

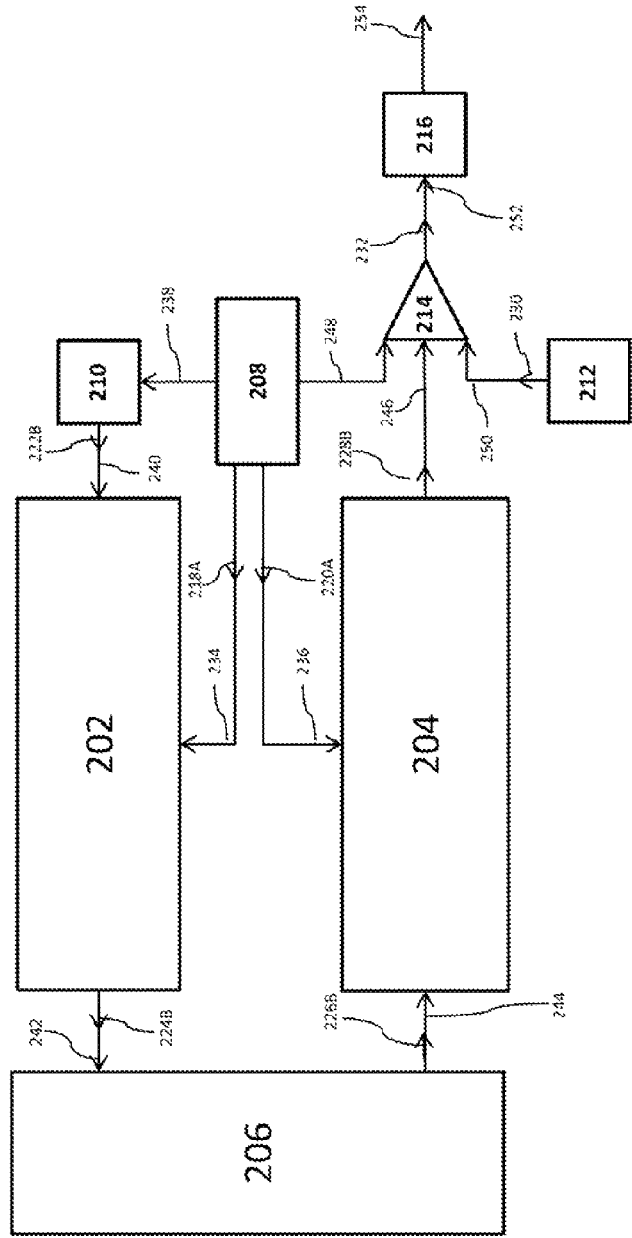

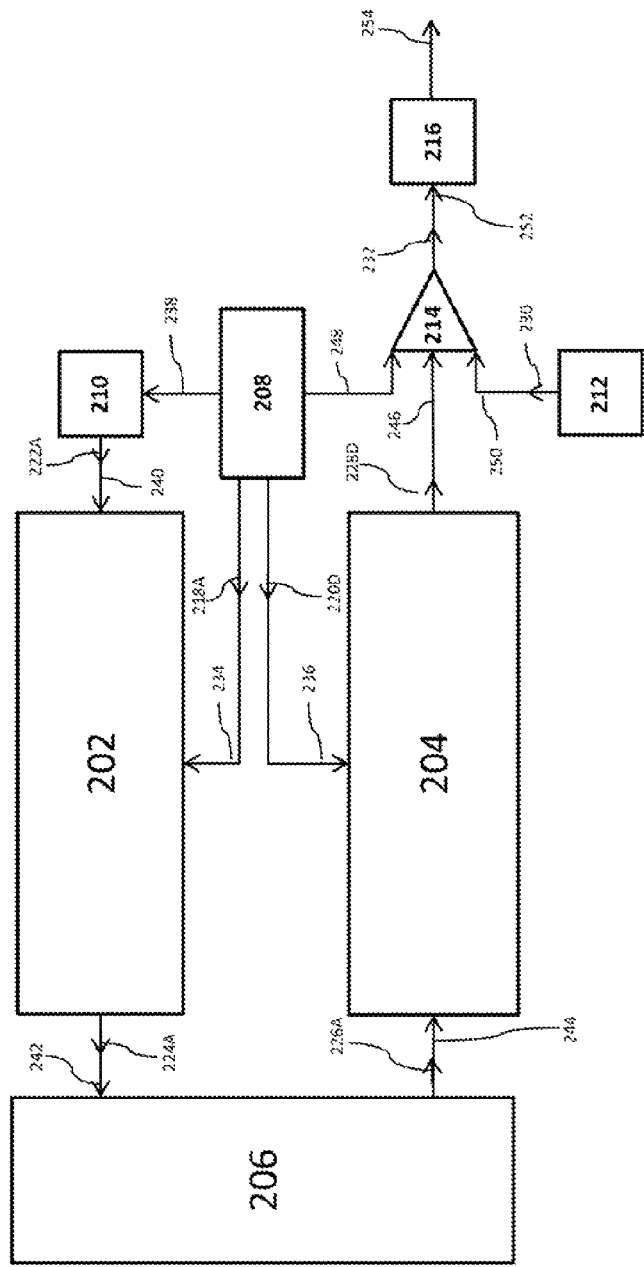

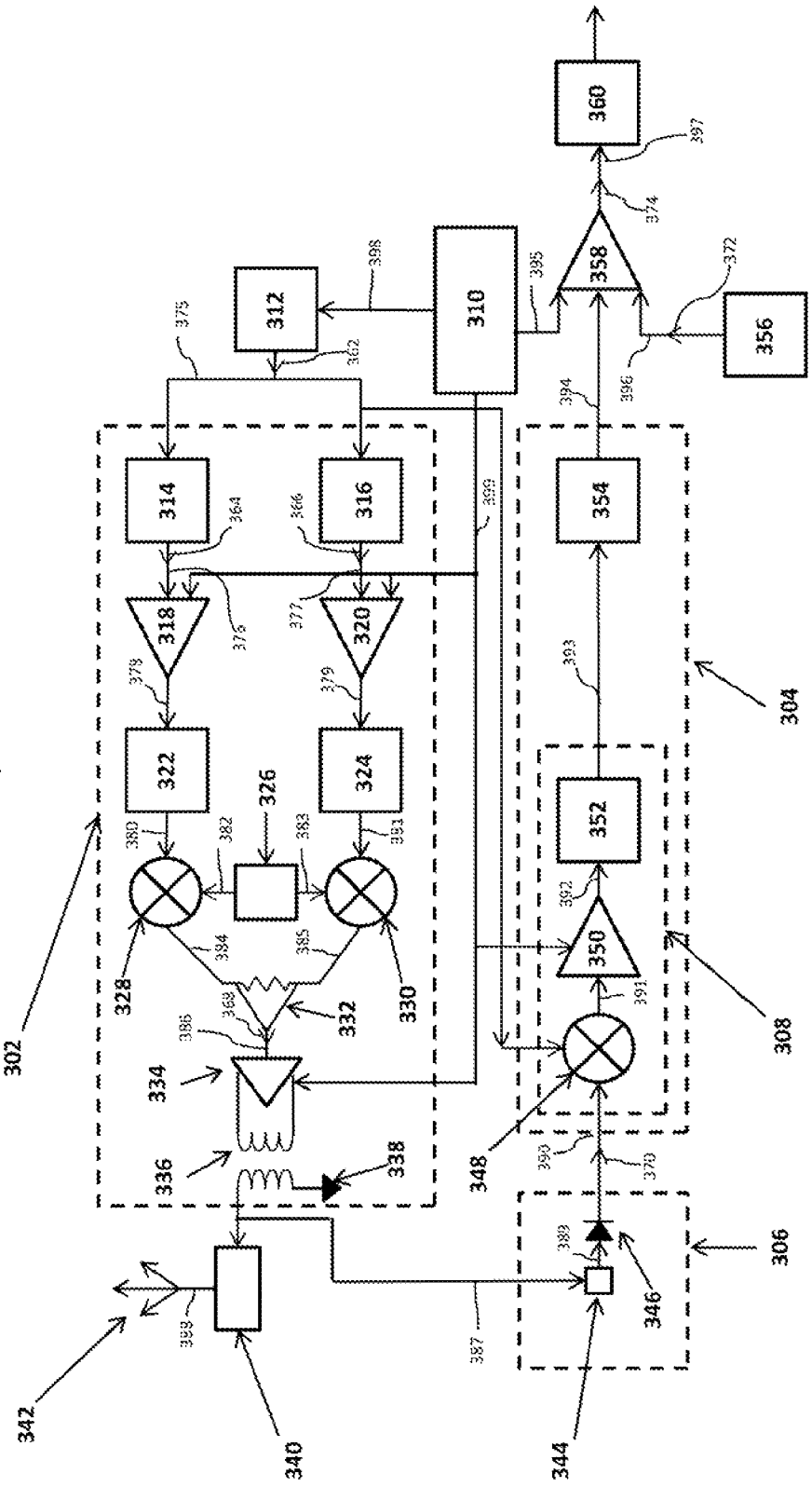

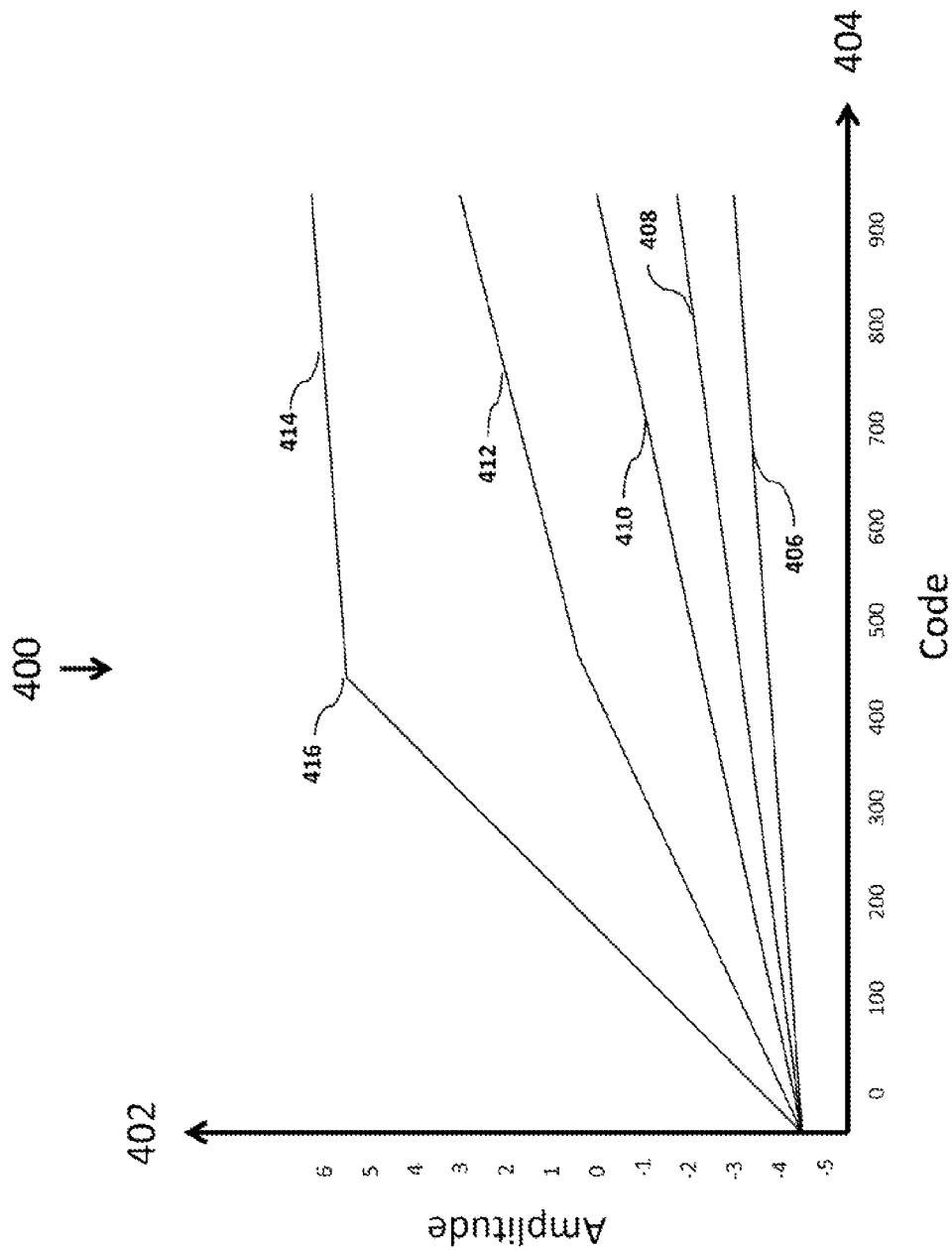

BUILT-IN TEST SYSTEM AND METHOD

BACKGROUND

A transceiver chip for mobile electronics applications is very complex. A customer may experience difficulties integrating the transceiver chip into their own platform. If a transceiver chip is implemented into a customer platform and does not work as intended, the transceiver chip can be tested for functionality.

Testing a transceiver chip can be costly because conventionally the only way a transceiver chip may be tested when integrated into a customer platform requires a field application engineer to be on site. The field application engineer must then use external equipment, measure the chip power supply levels, and read various product schematics, board layouts, and firmware variables to test the transceiver chip.

For a transceiver in normal operation, the near end transmitter transmits to a receiver at the other end of the link (another transceiver) and the far end chip transmits to a receiver in the near end chip. This is also how a transceiver chip is usually used when is integrated into someone's platform. When a fault is suspected, however, and a "self-test" is used for debug, the transmitter usually sends a test signal to its own receiver within the same chip. This will be described with reference to FIG. 1.

FIG. 1 illustrates a conventional transceiver chip integrated into a device platform 100.

As illustrated in the figure, device platform 100 includes a transceiver chip 102. Transceiver chip 102 further includes a transmitting component 104 and a receiving component 106.

Transmitting component 104 is operable to accept a signal to be transmitted, via line 108, from other hardware components (not shown) of device platform 100 Transmitting component 104 is additionally operable to transmit the signal received via line 108.

Receiving component 106 is operable to receive a signal transmitted by transmitting component 104. Receiving component 106 is additionally operable to provide the received signal, via line 110, to other hardware components of device platform 100.

In operation, a user will integrate transceiver chip 102 into device platform 100. In addition to transceiver chip 102, platform 100 contains a plurality of other hardware components. During normal operation, transmitting component 104 would receive signals from one of the hardware components of device platform 100. Once received, via line 108, transmitting component 104 would then transmit the signals. Simultaneously, receiving component 106 would receive signals and transmit them to a hardware component of device platform 100, via line 110.

However, in this example, presume that transceiver chip 102 is not operating properly and no signals are received or transmitted by either of transmitting component 104 or receiving component 106. At this point, a field application engineer from the supplier of transceiver chip 102 must be physically present to test transceiver chip 102. In order to test transceiver chip 102, the field application engineer must connect external equipment to transceiver chip 102.

The external equipment is used to measure various aspects of transceiver chip 102 such as RF leakage and the voltage level of nodes within transmitting component 104 and receiving component 106. Additional external equipment must be used to read the various firmware variables and hardware registers to determine the state and settings of transceiver chip 102. Additionally, the field application engineer must evaluate the schematics and board layout of transceiver chip 102.

A field application engineer travelling to the location of a user with external equipment, and proceeding to test transceiver chip 102 is costly and time consuming. The testing process additionally increases the development time of device platform 100.

If a field application engineer is not able to be physical present to test transceiver chip 102, they must lead the user step by step through the process of testing transceiver chip 102 over the phone. Due to the external equipment needed, lack of user familiarity, and complexity of transceiver chip 102, a field application engineer guiding a user through the process of testing transceiver chip 102 is a costly and time consuming process.

Once transceiver chip 102 is successfully tested, it may be integrated minto device platform 100. After being integrated into device platform 100, transceiver chip 102 begins operating normally as described above.

A problem with conventional transceiver chips is that the process of testing after integration into a user platform requires a field application engineer to either be physically present or guide a user the process step by step. Due to the required external equipment and complexity of conventional transceiver chips, the process of testing is costly and time consuming. Additionally, the testing process increases the development time of the user platform that integrated the transceiver chip.

What is needed is a system and method for testing a transceiver chip without the presence of a field application engineer or use of external equipment.

BRIEF SUMMARY

The present disclosure provides a system and method for testing a transceiver chip without the presence of a field application engineer or use of external equipment.

Aspects of the present disclosure are drawn to a communication device that includes a DC input component, a transmitting component, an envelope detecting component, a receiving component, a storage component and a comparator. The DC input component generates a first direct current signal and a second direct current signal. The transmitting component generates a first transmitted signal based on the first direct current signal and a second transmitted signal based on the second direct current signal. The envelope detecting component generates a first envelope signal based on the first transmitted signal and generates a second envelope signal based on the second transmitted signal. The receiving component generates a first received signal based on the first envelope signal and a second received signal based on the second envelope signal. The storage component has a priori information stored therein. The comparator outputs a correlation signal based on the first received signal, the second received signal and the a priori information.

Additional advantages and novel features of the disclosure are set forth in part in the description which follows, and in part will become apparent to those skilled in the art upon examination of the following or may be learned by practice of the disclosure. The advantages of the disclosure may be realized and attained by means of the instrumentalities and combinations particularly pointed out in the appended claims.

BRIEF SUMMARY OF THE DRAWINGS

The accompanying drawings, which are incorporated in and form a part of the specification, illustrate example embodiments of the present disclosure and, together with the description, serve to explain the principles of the disclosure. In the drawings:

FIG. 1 illustrates a conventional transceiver chip integrated into a device platform;

FIG. 2B illustrates a block diagram of a transceiver chip in accordance with aspects of the present disclosure;

FIG. 2D illustrates a block diagram of a transceiver chip in accordance with aspects of the present disclosure;

FIG. 3 illustrates a block diagram of a transceiver chip in accordance with aspects of the present disclosure; and FIG. 4 illustrates a graph of testing results of transceiver chip of FIG. 3 in accordance with aspects of the present disclosure.

DETAILED DESCRIPTION

Figure 2A:
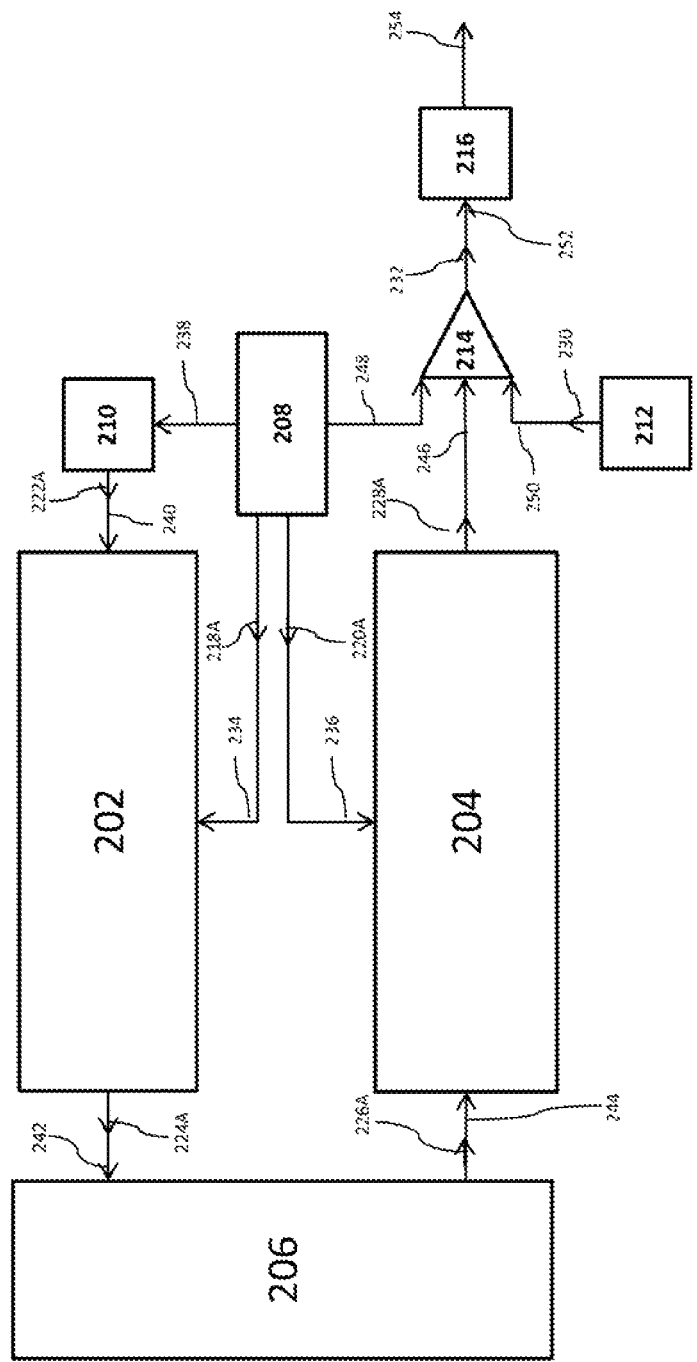
FIG. 2A illustrates a block diagram of a transceiver chip in accordance with aspects of the present disclosure.

The present disclosure provides a system and method for using a direct current (DC) input component and an envelope detector to test a transceiver chip by generating a signature without the use of external equipment. At least two signals are transmitted by a transmit chain then routed to the receiving component of a transceiver chip.

The signals routed through the receiving component of the transceiver chip are then manipulated to generate a signature. A baseline signature is stored by the transceiver chip based on a priori information by a properly operating transceiver chip. The correlation between the signature created by the transceiver chip and the baseline signature determines the transceiver chip is operating properly.

In some embodiments, the multiple signals used to generate the signature include signals having different amplitudes from the DC input component. For purposes of discussion, consider two signals, a first signal provided by the DC input component having a first amplitude and a second signal provided by the DC input component having a second amplitude. Let a transceiver have a specific transmitting component and a specific receiving component, each with respective amplifiers, transistors, capacitors, etc. Such a transceiver will have a transfer function such that for a specific DC input signal provided to the transmitting component, and subsequently received by the receiving component, a specific received signal will be generated. As such, the first signal provided by the DC input component having the first amplitude will generate a first received signal as output by the receiving component. Further, the second signal provided by the DC input component having the second amplitude will generate a second received signal as output by the receiving component.

The first received signal, corresponding to the first DC input signal, and the second received signal, corresponding to the second DC input signal, are used in a predetermined manner to generate a signature of the transceiver. The predetermined manner for which the two signals are used may be any known manner non-limiting examples of which include adding, subtracting, averaging, multiplying, or by taking some other mathematical relationship. Now that the signature is generated, it is used as a priori information as a baseline for comparisons with the transceivers of the same type to be manufactured.

In particular, the same type of transceiver may be manufactured with a built in test system including a DC input component able to generate the same two DC input signals, the a priori signature of the previously manufactured transceiver and a comparator. The DC input component will provide the same two DC input signals to generate corresponding received signals in the newly manufactured transceiver. The corresponding received signals will then be used to generate a new signature in the same manner as the a priori signature was generated. Then the comparator will compare the new signature with the a priori signature to determine whether the newly manufactured transceiver has the same transfer function as previous transceiver. If not, it may be determined that the newly manufactured transceiver is not functioning properly. If the signatures do match, it may be determined that the newly manufactured transceiver functions properly, at least with respect to the two DC input signals.

Of course, more than two DC input signals may be used to generate the a priori signature and to generate the subsequent signatures. In this light, as the number of different DC input signals increase, the more robust the system will become for determining whether a subsequent transceiver functions properly. However, such a test may not determine whether the newly manufactured transceiver will function properly with respect to other variable attributes—such as for example, under variable gain conditions.

In some cases, a transmitting component of a transceiver may have an adjustable gain. In these cases, the transfer function of the transceiver will be different for each gain setting of the transmitting component. To address this issue, in some embodiments, the multiple signals used to generate the signature include multiple instances of a constant amplitude DC input signal, wherein a gain setting within a variable gain amplifier in the transmitting component is changed for each instance of the constant amplitude DC input signal.

For purposes of discussion, consider two signals: a first signal provided by the DC input component having an amplitude and the transmitting component having been set at a first gain setting, and a second signal provided by the DC input component having the same amplitude but the transmitting component having been set at a second gain setting. Let a transceiver have a specific transmitting component and a specific receiving component, each with respective amplifiers, transistors, capacitors, etc. Such a transceiver will have a transfer function such that for a DC input signal provided to the transmitting component and for a specific gain setting of the transmitting component, a specific received signal will be generated. As such, the first signal provided by the DC input component at the first gain setting of the transmitting component will generate a first received signal as output by the receiving component. Further, the second signal provided by the DC input component at the second gain setting of the transmitting component will generate a second received signal as output by the receiving component.

The first received signal, corresponding to the first gain setting, and the second received signal, corresponding to the second gain setting, are used in a predetermined manner to generate a signature of the transceiver. The predetermined manner for which the two signals are used may be any known manner, non-limiting examples of which include adding, subtracting, averaging, multiplying, or by taking some other mathematical relationship. Now that the signature is generated, it is used as a priori information as a baseline for comparisons with the transceivers of the same type to be manufactured.

In particular, the same type of transceiver may be manufactured with a built in test system including a DC input component able to generate the DC input signals at the same two gain settings of the transmitting component, the a priori signature of the previously manufactured transceiver and a comparator. The DC input component will provide the same DC input signal at the same two gain settings to generate corresponding received signals in the newly manufactured transceiver. The corresponding received signals will then be used to generate a new signature in the same manner as the a priori signature was generated. Then the comparator will compare the new signature with the a priori signature to determine whether the newly manufactured transceiver has the same transfer function as previous transceiver. If not, it may be determined that the newly manufactured transceiver is not functioning properly. If the signatures do match, it may be determined that the newly manufactured transceiver functions properly, at least with respect to the DC input signal at the two gain settings of the transmitting component.

Of course more than two gain settings may be used to generate the a priori signature and to generate the subsequent signatures. In this light, as the number of different DC input signals increase, the more robust the system will become for determining whether a subsequent transceiver functions properly. However, such a test may not determine whether the newly manufactured transceiver will function properly with respect to other variable attributes—such as for example, under variable gain conditions—of the receiving component.

In some cases, a receiving component of a transceiver may have an adjustable gain. In these cases, the transfer function of the transceiver will be different for each gain setting of the receiving component. To address this issue, in some embodiments, the multiple signals used to generate the signature include multiple instances of a constant amplitude DC input signal, wherein a gain setting within a variable gain amplifier in the receiving component is changed for each instance of the constant amplitude DC input signal.

For purposes of discussion, consider two signals: a first signal provided by the DC input component having an amplitude and the receiving component having been set at a first gain setting; and a second signal provided by the DC input component having the same amplitude but the receiving component having been set at a second gain setting, Let a transceiver have a specific transmitting component and a specific receiving component, each with respective amplifiers, transistors, capacitors, etc. Such a transceiver will have a transfer function such that for a DC input signal provided to the transmitting component and for a specific gain setting of the receiving component, a specific received signal will be generated. As such, the first signal provided by the DC input component at the first gain setting of the receiving component will generate a first received signal as output by the receiving component. Further, the second signal provided by the DC input component at the second gain setting of the receiving component will generate a second received signal as output by the receiving component.

The first received signal, corresponding to the first gain setting, and the second received signal, corresponding to the second gain setting, are used in a predetermined manner to generate a signature of the transceiver. The predetermined manner for which the two signals are used may be any known manner, non-limiting examples of which include adding, subtracting, averaging, multiplying, or by taking some other mathematical relationship. Now that the signature is generated, it is used as a priori information as a baseline for comparisons with the transceivers of the same type to be manufactured.

In particular, in the same type of transceiver may be manufactured with a built in test system including a DC input component able to generate the DC input signals at the same two gain settings of the transmitting component, the a prior signature of the previously manufactured transceiver and a comparator. The DC input component will provide the same DC input signal at the same two gain settings to generate corresponding received signals in the newly manufactured transceiver. The corresponding received signals will then be used to generate a new signature in the same manner as the a priori signature was generated. Then the comparator will compare the new signature with the a priori signature to determine whether the newly manufactured transceiver has the same transfer function as previous transceiver. If not, it may be determined that the newly manufactured transceiver is not functioning properly. If the signatures do match, it may be determined that the newly manufactured transceiver functions properly, at least with respect to the DC input signal at the two gain settings of the receiving component.

Of course more than two gain settings may be used to generate the a priori signature and to generate the subsequent signatures. In this light, as the number of different DC input signals increase, the more robust the system will become for determining whether a subsequent transceiver functions properly. However, such a test may not determine whether the newly manufactured transceiver will function properly with respect to other variable attributes.

In some cases, a transmitting component and a receiving component of a transceiver may have an adjustable gain. In these cases, the transfer function of the transceiver will be different for each combination of DC input signals, gain settings of the transmitting component and gain settings of the receiving component. To address this issue, in some embodiments, the multiple signals used to generate the signature include a combination of different DC input signals, different gain settings within the transmitting component, and different gain settings within the receiving component, as discussed above.

Aspects of the present disclosure may be implements in many transceiver modulation schemes. For purposes of discussion, a non-limiting example of a transceiver using IQ Modulation (IQM) will be discussed.

In electronics and telecommunications, modulation is used to transmit information between two points. Modulation is the process of varying one or more properties of a periodic waveform, called the carrier signal, with a modulating signal that typically contains the information to be transmitted. One method of modifying a carrier signal is to use amplitude modulation. During amplitude modulation, the amplitude of a carrier signal is varied in proportion to the information being transmitted. After modulation, the carrier signal is then transmitted to a receiver. Once the carrier signal is received, the information can be obtained by demodulating the carrier signal.

Many modulation schemes exist and are commonly used today; one such modulation scheme is IQ Modulation (IQM). During amplitude modulation, the frequency of the carrier signal is slightly modified in addition to the carrier signal amplitude. The change in the carrier signal frequency and amplitude during amplitude modulation can be represented as the sum of two parts, the in-phase portion ("I") and the quadrature portion ("Q")

In IQM, two carrier signals are used to transmit information; the first carrier signal represents the in-phase portion of a modulated signal and the second carrier signal represents the quadrature portion of a modulated signal. First, each carrier wave is modulated using amplitude modulation and then the first in-phase carrier wave is multiplied by cosine and the second quadrature carrier wave is multiplied by sine. Multiplying each carrier signal by either cosine or sine creates a phase difference of 90° between the two signals. The signals are then summed together and transmitted to a receiver.

Once received, the signal may be multiplied by a cosine or sine to extract the first in-phase carrier wave or the second quadrature carrier wave. Once the two carrier waves have been obtained, they may be demodulated to obtain the transmitted information.

In accordance with a first aspect of the present disclosure, a DC input component is used to incrementally increase or decrease the gain of components within the I and Q legs of the transmit chain of an IQM transceiver. The gains are adjusted such that the amplitude of the transmitted signal is constant, the generated signal is then sent to an envelope detector.

An envelope detector uses a diode, resistor, and capacitor to take a signal as an input, and output a signal which is the envelope of the input signal. When an input signal is received it is passed through a diode in order to rectify the signal. Then the input signal is sent to a capacitor which stores energy when the input signal rises and slowly discharges the stored energy through the resistor when the input signal falls. In this manner, the output signal from an envelope detector is an envelope of the input signal.

Once the envelope detector generates an envelope signal, it is passed to the receiving component of the transceiver. The receiving component then outputs the envelope signal to a comparator. A new envelope signal is generated for each gain setting of the transmit chain of the transceiver chip, and then transmitted to the comparator.

After all of the generated signals reach the comparator, the comparator generates a signature based on the received envelope signals. The more signals used by the comparator to generate the signature, the more accurate the signature is. The comparator then finds the correlation, between the generated signature and a corresponding baseline signature stored by the transceiver chip.

If the two signals correlate, it can be determined that both the transmit chain and receiving component of the transceiver are operating correctly. If the two signals do not correlate, the results can help determine what component of the transceiver is not functioning properly. The transceiver chip may generate a signature by using a first gain and second gain of the transmit chain, a first gain and second gain of the receiving component, or a combination of gain settings for both the transmit chain and receiving component.

Example systems in accordance with the first aspect and second aspect of the present disclosure will now be described with reference to FIGS. 2A-4.

FIG. 2A illustrates a block diagram of a transceiver chip 200 in accordance with aspects of the present disclosure.

As illustrated in the figure, transceiver chip 200 includes a transmit chain 202, a receiving component 204, an envelope detecting component 206, a controller 208, a DC input component 210, a storage component 212, a comparator 214 and an output component 216.

In this example, transmit chain 202, receiving component 204, envelope detecting component 206, controller 208, DC input component 210, storage component 212, comparator 214 and output component 216 are illustrated as individual devices. However, in some embodiments, at least two of transmitting component 202, receiving component 204, envelope detecting component 206, controller 208, DC input component 210, storage component 212, comparator 214 and output component 216 may be combined as a unitary device. Further, in some embodiments, at least one of transmitting component 202, receiving component 204, envelope detecting component 206, controller 208, DC input component 210, storage component 212, comparator 214 and output component 216 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Transmitting component 202 is operable to accept input signal 222 from DC input component 210, via line 240, and receive setting signal 218, via line 234. Transmitting component 202 is additionally operable to generate and transmit signal 224, based on input signal 222 and setting signal 218. Transmitting component 202 is further operable to transmit signal 224 to envelope detecting component 206, via line 242.

Receiving component 204 is operable to receive envelope signal 226, via line 244, and setting signal 220, via line 236. Receiving component 204 is additionally operable to generate signal 228 based on envelope signal 226 and setting signal 220. Receiving component 204 is further operable to generate signal 228 to comparator 214, via line 246.

Envelope detecting component 206 is operable to generate envelope signal 226 based on signal 224 received from transmitting component 202, via line 242. Envelope detecting component 206 is additionally operable transmit envelope signal 226 to receiving component 204, via line 244.

Controller 208 is operable to instruct DC input component 210, via line 238, to transmit input signal 222A to transmitting component 202. Controller 208 is additionally operable to instruct transmitting component 202 to change its gain setting based on setting signal 218, via line 234, and receiving component 204 to change its gain setting based on setting signal 220, via line 236. Controller 208 is further operable to instruct comparator 214, via line 248, to compare a generated signature and signature 230, DC input component 210 is operable to transmit input signal 222 to transmitting component 202, via line 230, at a voltage level based on instructions received from controller 208, via line 238.

Storage component 212 is operable to contain a plurality of signatures based on each voltage level of input signal 222, and gain setting of transmitting component 202 and receiving component 204. Storage component 212 is additionally operable to transmit the signature corresponding to each voltage level of input signal 222, and gain setting of transmitting component 202 and receiving component 204 as signature 230 to comparator 214, via line 250.

Comparator 214 is operable to receive signal 228, via line 246, from receiving component 204. Comparator 214 is additionally operable to generate a signature based on each signal 228 for each voltage level of input signal 222, and gain setting of transmitting component 202 and receiving component 204. Comparator 214 is further operable to compare the generated signature to signature 230 received from storage component 212, via line 250. Comparator 214 is yet further operable to generate correlation signal 232 based on the comparison of the generated signature and signature 230. Comparator 214 is additionally operable to transmit correlation signal 232 to output component 216, via line 252, Output component 216 is operable to receive correlation signal 232 from comparator 214, via line 252. Output component 216 is additionally operable to output correlation signal 232, via line 254.

In FIG. 2A-D, each of setting signal 218, setting signal 220, input signal 222, signal 224, envelope signal 226, and signal 228 may be appended with a letter to mark their reference to each of FIG. 2A-D. For example, in FIG. 2A each signal above will be numbered as setting signal 218A, setting signal 220A, input signal 222A, signal 224A, envelope signal 226A, and signal 228A. Further, for some signals, a single signal reference label will be used to describe a signal path even though the signal passes through modification stages (e.g. A/D, D/A mixing, amps, etc.), In operation, transceiver chip 200 is not operating properly and needs to be tested for functionality. Transceiver chip 200 may be tested using the built-in testing aspect of the present disclosure.

During the testing process, transceiver chip 200 will evaluate the operation of transmitting component 202 and receiving component 204 using signals generated by DC input component 210. Using multiple input signals with varying voltage levels and gain settings allows transceiver chip 200 to determine if transmitting component 202 and receiving component 204 are operating at all points of their operating spectrum. The voltage levels of input signal 222A and the gain settings of transmitting component 202 and receiving component 204 have been predetermined in order to generate signals across the operational spectrum of transceiver chip 200.

When the process of testing transceiver chip 200 begins, controller 208 will instruct DC output 210, via line 238, to transmit input signal 222A at a first predetermined voltage level to transmitting component 202, Simultaneously, controller 208 will transmit setting signal 218A, via line 234, to instruct receiving component 204 to set its gain setting to a first gain level and transmit setting signal 220A, via line 236, to instruct receiving component 204 to set its gain setting to a first gain level.

After receiving instructions from controller 208, DC output 210 transmits input signal 222A at the instructed voltage level, to transmitting component 202, via line 240. After receiving input signal 222A, transmitting component 202 generates signal 224A by modifying the amplitude of input signal. 222A in an amount proportional to its gain setting. In this non-limiting example embodiment, signal 224A is generated by modifying the amplitude of input signal 222A, in other embodiments the frequency, duration, or modulation type of input signal 222A may be modified to generate signal 224A.

Once generated, transmit component 202 transmits signal 224A, via line 242, to envelope detecting component 206. Envelope detecting component 206 then generates envelope signal 226A based on signal 2244. Once envelope signal 226A is generated, it is transmitted by envelope detecting component 206 to receiving component 204, via line 244.

Receiving component 204 then generates signal 228A by modifying the amplitude of envelope signal 226A by an amount proportional to its gain setting. In this non-limiting example embodiment, signal 228A is generated by modifying the amplitude of envelope signal 226A, in other embodiments the frequency, duration, or modulation type of input envelope signal 226A may be modified to generate signal 228A. Receiving component 204 then transmits signal 228A to comparator 214, via line 246.

At this point, controller 208 will instruct DC input component 210 to transmit input signal 222 at a second predetermined voltage level. The operation of DC input component 210 transmitting input signal 222 at a second predetermined voltage level will now be discussed with additional reference to FIG. 2B.

FIG. 2B contains all of the same elements of FIG. 2A, except that input signal 222A, signal 224A, envelope signal 226A, and signal 228A will now be describe as input signal 2221, signal 224B, envelope signal 226B, and signal 228B since they are not the same signals as described above in FIG. 2A.

In operation, after controller 208 instructs DC input component 210 to transmit input signal 222 at a second predetermined voltage level, DC input component 210 transmits input signal 222B to transmitting component 202, via line 240. Input signal 222 is transmitted as input signal 222B instead of input signal 222A since it is transmitted at a dilfferent voltage level. The processing of input signal 222B is identical to the processing of input signal 222A of FIG. 2A.

Once transmitting component 202 receive input signal 222, it will generate signal 224B by modifying the amplitude of input signal 222B by an amount proportional to its gain setting. In this example embodiment, only the voltage level of input signal 222 has been modified. The gain setting of transmitting component 202 and receiving component 204 are still at a first predetermined gain level as in FIG. 2A. After generation, transmitting component 202 transmits signal 224B to envelope detecting component 206.

Envelope detecting component 206 then generates envelope signal 226B, based on signal 224B. Next, envelope detecting component 206 transmits envelope signal 226B to receiving component 204, via line 244. Receiving component 204 modifies envelope signal 226B by an amount proportional to its gain setting in order to generate signal 228B. At this point, receiving component 204 transmits signal 228B to comparator 214.

Once comparator 214 receives signal 228A and signal 228B, it generates a signature by adding signal 228A and signal 228B together. In this non-limiting example embodiment, comparator 214 generates a signature by addition. In other example embodiments comparator 214 may generate a signature by multiplication, division, or using an equation.

After comparator 214 generates a signature based on signal 228A and signal 228B, storage component 212 transmits signature 230 to comparator 214, via line 250. Signature 230 is a priori information that represents the expected signature generated by comparator 214 based on the first voltage level and second voltage level of input signal 222. Signature 230 is a priori information created by generating a signature in the same manner as comparator 214 using signals of a properly working transceiver chip. The signature based on the properly working transceiver chip can be used as a comparison to determine if the transceiver chip being tested is operating properly, After receiving signature 230, comparator 214 then generates correlation signal 232 based on the correlation between signature 230 and the generated signature. Once generated, comparator 214 transmits correlation signal 232 to output component 216, via line 252. Output component 216 then outputs correlation signal 232 to a user, via line 254. At this point a user may determine the functionality of transceiver chip 200 for the first voltage level and second voltage level of input signal 222, based on correlation signal 232.

In this example embodiment, correlation signal 232 is based on the different voltage levels of input signal 222. In other example embodiments correlation signal 232 may be based on the different gain settings of transmitting component 202. The operation of testing transceiver chip 200 at a second gain setting of transmitting component 202 will now be discussed with additional reference to FIG. 2C.

Figure 2C:
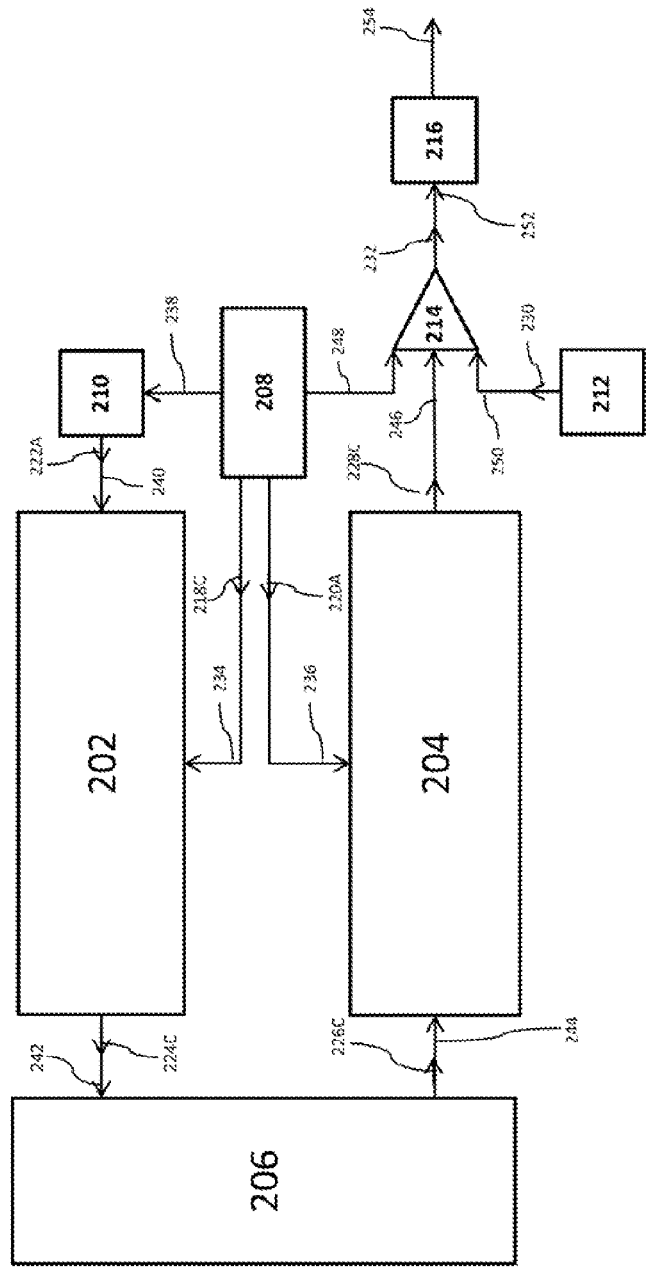
FIG. 2C illustrates a block diagram of a transceiver chip in accordance with aspects of the present disclosure.

FIG. 2C contains all of the same elements of FIG. 2A, except setting signal 218A, signal 224A, envelope signal 226A, and signal 228A will now be describe as setting signal 218C, signal 224C, envelope signal 226C and signal 228C since they are not the same signals as described above it FIG. 2A.

After comparator 214 receives signal 228A as described above in FIG. 2A, controller 208 may transmit setting signal 218C, via line 234, to instruct transmitting component 202 to change from a first predetermined gain setting to a second predetermined gain setting.

In operation, after transmitting component 202 changes from a first gain setting to a second gain setting, controller 208 will instruct DC input component 210 to transmit input signal 222A to transmitting component 202. After transmitting component 202 receives input signal 222A, it generates signal 224C by modifying the amplitude of input signal 222A by an amount proportional to its second gain setting. Once signal 224C is generated, transmitting component 202 transmits signal 224C to envelope detecting component 206, via line 242.

Envelope detecting component 206 then generates envelope signal 226C, based on signal 224C. Next, envelope detecting component 206 transmits envelope signal 226C to receiving component 204, via line 244. Receiving component 204 modifies envelope signal 226C by an amount proportional to its gain setting in order to generate signal 228C. The gain setting of receiving component 204 is the same as in FIG. 2A, only the gain setting of transmitting component 202 is different. At this point, receiving component 204 transmits signal 228C to comparator 214.

At this point, comparator 214 generates a signature based on signal 228A and signal 228C. After the signature is generated, storage component 212 transmits signature 230 to comparator 214, via line 250. Signature 230 is based on the expected signature generated by comparator 214 based on the first gain setting and second gain setting of transmitting component 202.

After receiving signature 230, comparator 214 then generates correlation signal 232 based on the correlation between signature 230 and the generated signature. Once generated, comparator 214 transmits correlation signal 232 to output component 216, via line 252. Output component 216 then outputs correlation signal 232 to a user, via line 254. At this point a user may determine the functionality of transceiver chip 200 for the first gain setting and second gain setting of transmitting component 202, based on correlation signal 232.

In this example embodiment, correlation signal 232 is based on the different gain settings of transmitting component 202, in other example embodiments correlation signal 232 may be based on the different gain settings of receiving component 202. The operation of testing transceiver chip 200 at a second gain setting of receiving component 204 will now be discussed with additional reference to FIG. 2D.

FIG. 2D contains all of the same elements of FIG. 2A, except setting signal 220A and signal 228A will now be describe as setting signal 220D and signal 228D since they are not the same signals as described above in FIG. 2A.

Similar to the process as described above in FIG. 3, after comparator 214 receives signal 228A as described above in FIG. 2A, controller 208 may transmit setting signal 220D, via line 236, to instruct receiving component 204 to change from a first predetermined gain setting to a second predetermined gain setting.

In operation, after receiving component 204 changes from a first gain setting to a second gain setting, controller 208 will instruct DC input component 210 to transmit input signal 222A to transmitting component 202. After transmitting component 202 receives input signal. 222A, it generates signal 224A by modifying the amplitude of input signal 222A by an amount proportional to its first gain setting. Once signal 224A is generated, transmitting component 202 transmits signal 224A to envelope detecting component 206, via line 242.

Envelope detecting component 206 then generates envelope signal 226A, based on signal 224A. Next, envelope detecting component 206 transmits envelope signal 226A to receiving component 204, via line 244. Receiving component 204 modifies envelope signal 226A by an amount proportional to its second gain setting in order to generate signal 228D.

At this point, comparator 214 generates a signature based on signal 228A and signal 228D. After the signature is generated, storage component 212 transmits signature 230 to comparator 214, via line 250. Signature 230 is based on the expected signature generated by comparator 214 based on the first gain setting and second gain setting of receiving component 202.

After receiving signature 230, comparator 214 then generates correlation signal 232 based on the correlation between signature 230 and the generated signature. Once generated, comparator 214 transmits correlation signal 232 to output component 216, via line 252. Output component 216 then outputs correlation signal 232 to a user, via line 254. At this point a user may determine the functionality of transceiver chip 200 for the first gain setting and second gain setting of receiving component 202, based on correlation signal 232.

In the example embodiments described above in FIGS. 2A-D, the voltage level of input signal 222, and the gain settings of transmitting component 202 and receiving component 204 were changed individually. In other example embodiments, a combination of changes in any of voltage level of input signal 222, or the gain setting of transmitting component 202 and receiving component 204 may be implemented.

Additionally, in the example embodiments described above in FIGS. 2A-D, the voltage level of input signal 222, and the gain levels of transmitting component 202 and receiving component 204 were only changed from a first setting to a second setting. In further embodiments, the voltage level of input signal 222, and the gain levels of transmitting component 202 and receiving component 204 may be changed to a plurality of settings. The ability to test the operation of transceiver chip 200 at a plurality of voltage levels and gain settings in any combination creates a very robust testing process.

The example embodiments in FIGS. 2A-D illustrate the high level operation of a transceiver chip in accordance with aspects of the present disclosure. The process of testing a transceiver chip in accordance with aspects of the present disclosure at the component level will now be discussed with additional reference to FIG. 3.

FIG. 3 illustrates a transceiver chip 300 in accordance with aspects of the present disclosure.

As illustrated in the figure, transceiver chip 300 includes a transmitting component 302, a receiving component 304, an envelope detecting component 306, a controller 310, a DC input component 312, a band bass filter 340, an antenna 342, a storage component 356, a comparator 358, and an output component 360. Transmitting component 302 further includes a digital-to-analog converter (DAC) 314, a DAC 316, a variable gain amplifier (VGA) 318, a VGA 320, a low pass filter (LPF) 322, an LPF 324, a phase shifter 326, a mixer 328, a mixer 330, a power combiner 332, a differential power amplifier (DPA) 334, a transformer 336, and a ground 338. Receiving component 304 further includes a monitor pass 308 and a DAC 354. Monitor pass 308 further includes a mixer 348, a VGA 350, and an LPF 352. Envelope detector 306 further includes a capacitor 344 and a diode 346.

Controller 310 is operable to instruct DC input component 312, via line 398, to transmit input signal 362 at a first predetermined voltage level at a first time, and to transmit voltage 362 at a second predetermined voltage at a second time. Controller 310 is additionally operable to instruct comparator 356, via line 395, to generate and transmit correlation signal 374 at a third time.

Controller 310 is further operable to instruct one of VGA 318 and VGA 320 to adjust their gain from a first gain setting to a second gain setting, via line 399. Controller 310 is yet even further operable to instruct DPA 334 to adjust its gain from a first gain setting to a second gain setting, via line 399, where the first and second gain setting of DPA 334 are different than the first and second gain setting of VGA 318 and VGA 320.

In this manner, controller 310 is able to change the gain setting of any one of DC input component 312, VGA 318, VGA 320, or DPA 334 independently of each other. Adjusting the gain of each component individually rather than as a group allows the functionality of each of DC input component 312, VGA 318, VGA 320, and DPA 334 to be determined individually.

DC input component 312 is operable to transmit input signal 362 to DAC 314, DAC 316, via line 375, at a first voltage level or second voltage level based on instructions from controller 310. DC input component 312 is additionally operable to transmit input signal 362 as a digital signal.

DAC 314 is operable to receive input signal 362, via line 375, from DC input component 312 and convert it into analog signal 364. DAC 314 is additionally operable to transmit analog signal 364 to VGA 318, via line 376. DAC 316 is operable to receive input signal 362, via line 375, from DC input component 312 and convert it into analog signal 366. DAC 316 is additionally operable to transmit analog signal 366 to VGA 320, via line 377.

VGA 318 is operable to receive analog signal 364 from DAC 314, via line 376, and modify the amplitude of analog signal 364 by an amount proportional to its gain setting. VGA 318 is additionally operable to modify the amplitude of analog signal 364 by a first gain setting or second gain setting as instructed by controller 310, via line 399. VGA 318 is further operable to transmit analog signal 364 to LPF 322, via line 378.

VGA 320 is operable to receive analog signal 366 from DAC 316, via line 377, and modify the amplitude of analog signal 366 by an amount proportional to its gain setting. VGA 320 is additionally operable to modify the amplitude of analog signal 366 by a first gain setting or second gain setting as instructed by controller 310, via line 399. VGA 320 is flrther operable to transmit analog signal 366 to LPF 324, via line 379.

LPF 322 is operable to filter analog signal 364 received from VGA 318, via line 378. LPF is additionally operable to transmit analog signal 364 to mixer 328, via line 380. LPF 324 is operable to filter analog signal 366 received from VGA 320, via line 379. LPF is additionally operable to transmit analog signal 366 to mixer 330, via line 381.

Phase shifter 326 is operable to transmit a cosine signal to mixer 328, via line 382, and transmit a sine signal to mixer 330, via line 383.

Mixer 328 is operable to multiply analog signal 364 and the cosine signal from phase shifter 326. Mixer 328 is additionally operable to transmit analog signal 364 to power combiner 332, via line 384. Mixer 330 is operable to multiply analog signal 366 and the sine signal from phase shifter 326. Mixer 328 is additionally operable to analog signal 366 to power combiner 332, via line 385.

Power combiner 332 is operable to generate signal 368 by summing analog signal 364 from mixer 328, via line 384, and analog signal 366 from mixer 330, via line 385. Power combiner 332 is additionally operable to generate signal 368 to DPA 334, via line 386.

DPA 334 is operable to receive signal 368 from power combiner 332, via line 386, then modify the amplitude of signal 368 by an amount proportional to its gain setting. DPA 334 is additionally operable to modify the amplitude of signal 368 by a first gain setting or a second gain setting as instructed by controller 310, via line 399. DPA 334 is further operable to transmit signal 368 to transformer 336.

Transformer 336 is operable to modify the voltage of signal 368 from DPA 334 for transmission by antenna 342. Transformer 336 is additionally operable to transmit signal 368 to band pass filter 340 and to capacitor 344 of envelope detector 306, via line 387.

Ground 338 is operable to provide an electrical ground for transformer 336.

Band pass filter 340 is operable to filter signal 368 received from transformer 336, via line 387. Band pass filter 340 is additionally operable to transmit signal 368 to antenna 342, via line 388.

Antenna 342 is operable to transmit signal 368 received from band pass filter 340, via line 388.

Capacitor 344 is operable to receive signal 368 from transformer 336, via line 387. Capacitor 344 is additionally operable to store energy from signal 368 when the amplitude of signal 368 is rising and discharge energy to diode 346, via line 389, when the amplitude of signal 368 is falling.

Diode 346 is operable to allow energy to flow from capacitor 344 to mixer 348 of monitor pass 308 as envelope signal 370, via line 390, and to not allow current to flow from mixer 348 to capacitor 344.

Capacitor 344 and diode 346 operate together to form envelope detector 306. When the amplitude of signal 368 is rising, the output of diode 346 is very similar to that of signal 368, but due to the discharge of stored energy of capacitor 344 when the amplitude of signal 368 falls, the signal output from diode 346 does not fall as well. In this manner, the signal output from diode 346 "envelopes" the input signal.

Mixer 348 is operable to receive input signal 362 from DC offset 312, via line 375, and envelope signal 370 from diode 346, via line 390. Mixer 348 is additionally operable to mux envelope signal 370 and input signal 362 and then transmit envelope signal 370 to VGA 350, via line 391.

VGA 350 is operable to modify the amplitude of envelope signal 370 by an amount proportional to its gain setting. VGA 350 is additionally operable to transmit envelope signal 370 to LPF 352, via line 392.

LPF 352 is operable to filter envelope signal 370 received from VGA 350, via line 392. VGA 350 is additionally operable to transmit envelope signal 370 to DAC 354, via line 393.

DAC 354 is operable to receive envelop signal 370, via line 393, from LPF 352 and convert it from an analog signal into a digital signal. DAC 354 is additionally operable to transmit envelope signal 370 to comparator 358 via line 394.

Storage component 356 is operable to store a priori information associated with the first and second gain settings of DC input component 312, VGA 318, VGA 320, and DPA 334. Storage component 356 is additionally operable to transmit the stored a priori information associated with the current gain settings of DC input component 312, VGA 318, VGA 320, and DPA 334 as signature 372 to comparator 358, via line 396.

Comparator 358 is operable to generate a signature based on each envelope signal 370 received based on different gain settings of DC input component 312, VGA 318, VGA 320, and DPA 334. Comparator 358 is additionally operable to generate correlation signal 374 based on the generated signature and signature 372 when instructed by controller 310, via line 395. Comparator 358 is additionally operable to transmit correlation signal 374 to output component 360, via line 397.

Output component 360 is operable to receive correlation signal 374 from comparator 358, via line 397, and output it to a user.

In this example, envelope detector 306, controller 310, DC input component 312, DAC 314, DAC 316, VGA 318, VGA 320, LPF 322, LPF 324, phase shifter 326, mixer 328, mixer 330, power combiner 332, DPA 334, band pass filter 340, mixer 348, VGA 350, LPF 352, DAC 354, comparator 358, storage component 356, and output component 360 are illustrated as individual devices. However, in some embodiments, at least two of envelope detector 306, controller 310, DC input component 312, DAC 314, DAC 316, VGA 318, VGA 320, LPF 322, LPF 324, phase shifter 326, mixer 328, mixer 330, power combiner 332, DPA 334, band pass filter 340, mixer 348, VGA 350, LPF 352, DAC 354, comparator 358, storage component 356, and output component 360 may be combined as a unitary device. Further, in some embodiments, at least one of envelope detector 306, controller 310, DC input component 312. DAC 314, DAC 316, VGA 318, VGA 320, LPF 322, LPF 324, phase shifter 326, mixer 328, mixer 330, power combiner 332, DPA 334, band pass filter 340, mixer 348, VGA 350, LPF 352, DAC 354, comparator 358, storage component 356, and output component 360 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In operation, a user finds that transceiver chip 300 is not operating correctly. At this point, the user will attempt test the operation of transceiver chip 300 by instructing controller 310 to begin the testing process.

After being instructed to begin testing the operation of transceiver chip 300, controller 310 will instruct VGA 318, VGA 320, and DPA 334, via line 399, to modify their gain settings to their lowest level. The lowest gain level of VGA 318, VGA. 320, and DPA 334 are independent of each other, the lowest gain level of VGA 318 may be lower than the lowest gain level of VGA 320 and DPA 334 or the lowest gain level of DPA 334 may be much higher than the lowest gain level of VGA 318 and VGA 320. Simultaneously, controller 310 will instruct DC input component 312 to transmit input signal 362 to DAC 314 and DAC 316 at the lowest voltage level allowable.

The gain settings of VGA 318, VGA 320, and DPA 334 and voltage levels of input signal 362 are predetermined settings. Each gain setting and voltage level has corresponding a priori information stored within storage component 356. The gain settings and voltage levels of VGA 318, VGA 320, and DPA 334 must correspond to a priori information stored within storage component 356 so that comparator 358 has an expected signature that can be used for correlation.

At this time, DAC 314 and DAC 316 receive input signal 362. DAC 314 converts input signal 362 from a digital signal into analog signal 364 and DAC 316 converts input signal 362 from a digital signal into analog signal 366. After, DAC 314 transmits analog signal 364 to VGA 318, via line 376, and DAC 316 transmits analog signal 366 to VGA 320, via line 377.

VGA 318 then modifies the amplitude of analog signal 364 by a amount proportional to its gain setting, as instructed by controller 310. After modifying the amplitude of analog signal 364, VGA 318 transmits analog signal 364 to LPF 322, via line 378. At the same time, VGA 320 modifies the amplitude of analog signal 366 by an amount proportional to its gain setting, as instructed by controller 310. After, VGA 320 transmits analog signal 366 to LPF 324.

LPF 322 filters analog signal 364 and LPF 324 filters analog signal 366 in order to remove any noise that may have been generated during the amplitude modification of analog signal 364 and analog signal 366. After filtering, LPF 322 transmits analog signal 364 to mixer 328 and LPF 324 transmits analog signal 366 to mixer 330.

At this point, phase shifter 326 transmits a cosine signal to mixer 328, via line 382, and transmits a sine signal to mixer 330, via line 383. Phase shifter transmits a cosine signal to mixer 328 and a sine signal to mixer 330 so that after mixing, analog signal 364 and analog signal 366 will be 90° out of phase with each other.

Next, mixer 328 mixes analog signal 364 and the cosine signal from phase shifter 326 and mixer 330 mixes analog signal 366 and the sine signal from phase shifter 326. Once mixed, mixer 328 transmits analog signal 364 to power combiner 332, via line 384, and mixer 330 transmits analog signal 366 to power combiner 332, via 385.

After receiving analog signal 364 and analog signal 366, power combiner sums the two signals to create signal 368. Since analog signal 364 and analog signal 366 are 90° out of phase, if needed, each individual signal can be obtained at a later time by multiplying signal 368 by either cosine or sine.

Power combiner 332 then transmits signal 368 to DPA 334. DPA 334 modifies the amplitude of signal 368 by an amount proportional to its gain setting as instructed by controller 310. After modifying its amplitude, DPA 334 transmits signal 368 to transformer 336. Transformer 336 then transmits signal 368 to band pass filter 340 and capacitor 344 of envelope detector 306, via line 387.

Band pass filter 340 filters any noise out of signal 368 that may have been created during the mixing or combining of analog signal 364 and analog signal 366 or amplitude modification of signal 368. After filtering, band pass filter 340 transmits signal 368 to antenna 342, via line 388, which then transmits signal 368. The transmission of signal 368 by antenna 342 occurs during the normal operation of transceiver chip 300. During testing, signal 368 is additionally transmitted to envelope detector 306 by transformer 336. In this manner, the transmitted signal of transmitting component 302 and the received signal of receiving component 304 are the same signal. This allows transceiver chip 300 to be tested without having to use external equipment or rely on the receive signal of receiving component 304 being transmitted by another device in the exact same manner as signal 368.

Capacitor 344 receives signal 368 from transformer 336, via line 387. Capacitor 344 stores energy as the amplitude of signal 368 rises and discharges stored energy to diode 346, via line 389, as the amplitude of signal 368 falls. Diode 346 allows current from capacitor 344 to flow to mixer 348 of monitor pass 308 but not from mixer 348 to capacitor 344. Capacitor 344 storing and discharging energy and diode 346 allowing current to flow in one direction allows envelope detector 306 to create envelope signal 370 based on signal 368.

At this point, envelope detector 306 transmits envelope signal 370 to mixer 348. Simultaneously, DC input component provides input signal 362 to mixer 348, via line 375. Mixer 348 then mixes envelope signal 370 and input signal 362, and then transmits envelope signal 370 to VGA 350. VGA 350 then modifies the amplitude of envelope signal 370 by an amount proportional to its gain setting. Mixer 348 and envelope signal 370 modify envelope signal 370 to ensure that it is at a level that can be detected properly by the rest of receiving component 304.

Next, VGA 350 transmits envelope signal 370 to LPF 352, via line 392. LPF 352 filters envelope signal 370 to eliminate any noise that may have been generated by mixer 348 or VGA 350. After envelope signal 370 is filtered, it is transmitted to DAC 354 by LPF 352, via line 393. DAC 354 then converts envelope signal 370 from an analog signal into a digital signal. Once envelope signal 370 is converted from analog to digital, it is transmitted to comparator 358 by DAC 354, via line 394.

After comparator 358 receives envelop signal 370, controller 310 will instruct VGA 318 to increase its gain setting to the next lowest predetermined gain level. The process of testing transceiver chip 300 with the new gain setting of VGA 318 is identical as the process described above. After comparator 358 receives envelope signal 370 for each new gain setting, controller 310 will start the process over for the next lowest predetermined gain level of VGA 318. Once comparator 358 has received envelope signal 370 for each gain setting of VGA 358, controller 310 will instruct comparator 358 to generate a signature based on all of the envelope signals generated.

Once the signature has been generated, storage component 356 transmits the a priori information associated with the varying gain settings of VGA 318 to comparator 358 as signature 372. Once comparator 358 receives signature 372, controller 310 instructs comparator 358, via line 395, to generate correlation signal 374.

At this time, comparator 358 finds the correlation between the generated signature and signature 372. If comparator 358 finds that the generated signature and signature 372 have a high degree of correlation, transmitting component 302 and receiving component 304 are working properly. If comparator 358 finds that the generated signature and signature 372 have a low degree of correlation, at least one of the components of transmitting component 302 or receiving component 304 are not working properly. Comparator 358 then generates correlation signal 374 based on the degree of correlation between the generated signature and signature 372. Once generated, comparator 358 transmits correlation signal 374 to output component 360, via line 397. Output component 360 then outputs correlation signal 374 to a user.

Controller 310 will continue testing the operation transceiver chip 300 by changing comparing the signature generated by comparator 358 based on the varying gain settings of VGA 320, DPA 334 and varying voltage of input signal 362 to the corresponding signature 372 transmitted by storage component 356. In this manner, the operation of transceiver chip 300 can be determined for its entire operational range. Each time a signature is generated and correlated by comparator 352, the resulting correlation signature is output to a user via output component 360. A user will then be able to determine the operation of transceiver chip 300 based on the correlation signals.

Example correlation signals output by transceiver chip 300 during testing will now be discussed with reference to FIG. 4.

FIG. 4 illustrates a graph 400 of correlation signals output during testing of transceiver chip 300 in accordance with aspects of the present disclosure.

As illustrated in the figure, graph 400 includes a Y-Axis 402, an X-Axis 404, a line 406, a line 408, a line 410, a line 412, and a line 414.

Y-Axis 402 represents the voltage of the envelope signal output by receiving component 304 of transceiver chip 300 of FIG. 3. X-Axis 404 represents the code for each gain setting combination for VGA 318, VGA 320, and DPA 334 of transceiver chip 300 of FIG. 3.

Line 406 represents the correlation signal of transceiver chip 300 of FIG. 3 for each gain setting of VGA 318 at the lowest voltage level of input signal 362.

Line 408 represents the correlation signal of transceiver chip 300 of FIG. 3 for each gain setting of VGA 320 at the lowest voltage level of input signal 362.

Line 410 represents the correlation signal of transceiver chip 300 of FIG. 3 for each gain setting of DPA 334 at the lowest voltage level of input signal 362.

Line 410 represents the correlation signal of transceiver chip 300 of FIG. 3 for the middle point voltage level of input signal 362 and middle point gain setting of VGA 318, VGA 320, and DPA 334.

Line 412 represents the correlation signal of transceiver chip 300 of FIG. 3 for the middle point voltage level of input signal 362 and middle point gain setting of VGA 318, VGA 320, and DPA 334.

In operation, as the gain of VGA 318 is increased during testing of transceiver chip 300 of FIG. 3, the amplitude of envelope signal 370 increases as well. This increase is expected as shown the resulting correlation signal represented by line 406. If line 406 deviates from the a priori information stored by storage component 356 at any point, it would indicate that transceiver chip 300 is not operating at that the gain setting that corresponds to the code of X-Axis 404. Similarly, as the gain setting of VGA 320 and DPA 334 is increased during the testing process of transceiver chip 300, the amplitude of envelope signal 370 increases as expected which is shown by the resulting correlation signals represented by each of line 408 and line 410.

Once envelope signal 370 has been verified for each gain setting of VGA 31.8, VGA 320, and DPA 334 at the lowest voltage level of input signal 362, the process starts over at the next highest voltage level of input signal 362. At the middle point of the voltage level range of input signal 362, the amplitude of envelop signal 370 increases as each gain setting of DPA 334 increases as shown by the resulting correlation signal as shown by line 412.

At the maximum input voltage of input signal 362, the amplitude of envelope signal 370 is once again verified for each gain setting of DPA 334 as shown by line 414. At point 416, there is a sharp change in the increase in amplitude of envelope signal 370. Point 416 represents the saturation point of envelope signal 370 and is an expected result. As such, it can be determined that transceiver chip 300 is operating properly.

A problem with the conventional system and method for testing transceiver chips is that there are a plurality of platforms that integrate transceiver chips. Do to the number of possible applications; a field application engineer needs to be physically present to test the transceiver chip. In addition to being physically present, the field application engineer must bring along external equipment to actually perform the testing.

Another problem with the convention system and method for testing transceiver chips is that if a field application engineer is not able to be physically present, they must guide a user through the testing process step by step. Due to the required external equipment and complexity of the testing process, it may take considerable time and resources for a field application engineer to lead a user through the testing process.

A field application engineer being physically present or guiding a user through the testing process are both time intensive processes. The time used in the testing process increases the development time of the user platform device that the transceiver chip was integrated into.

The present system and method for testing a transceiver chip is done on the transceiver chip itself eliminating the need for a field application engineer or user to perform the testing. A transceiver chip in accordance with aspects of the present disclosure uses a controller, envelope detector, and storage component to perform testing on chip. The controller incrementally increases the gain of each component in the transmitting component and receiving component of the transceiver chip. An envelope detector then captures and after processing, transmits the signal to a comparator. The comparator then compares the signal to a priori information stored within the storage component.

Depending on the correlation or lack thereof between the signal and a priori information, it can be determined if the transceiver chip is operating properly or not. The results are then transmitted to a user, via an output component. The user may then use the results of the test to determine how to proceed.

The foregoing description of various preferred embodiments of the disclosure have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A communication device comprising:
    a DC input component operable to generate a first direct current signal and a second direct current signal;
    a transmitting component connected to the DC input component, the transmitting component including a transmitting amplifier, the transmitting component operable to generate a first transmitted signal based on the first direct current signal and a second transmitted signal based on the second direct current signal;
    an envelope detecting component operable to generate a first envelope signal based on the first transmitted signal and to generate a second envelope signal based on the second transmitted signal;
    a receiving component including a receiving amplifier, the receiving component operable to generate a first received signal based on the first envelope signal and a second received signal based on the second envelope signal;
    a storage component having a priori information stored therein; and
    a comparator connected to the receiving component and the storage component, the comparator operable to output a correlation signal based on the first received signal, the second received signal and the a priori information.

2. The communication device of claim 1, including a controlling component connected to the DC input component, the controlling component operable to instruct the DC input component to generate the first direct current signal at a first time and to instruct the DC input component to generate the second direct current signal at a second time.

3. The communication device of claim 2, in which the controlling component is further connected to the comparator and is further operable to instruct the comparator to output the correlation signal at a third time.

4. The communication device of claim 3, in which the transmitting amplifier includes a variable gain, differential power amplifier.

5. The communication device of claim 4, in which the receiving amplifier includes a variable gain amplifier.

6. The communication device of claim 5,
    in which the controlling component is further connected to the receiving component and is further operable to instruct the variable gain, differential power amplifier to change from a first gain setting to a second gain setting;
    in which the controlling component is further connected to the transmitting component and is further operable to instruct the variable gain amplifier to change from a third gain setting to a fourth gain setting.

7. The communication device of claim 6, in which the comparator is operable to output the correlation signal based on the first gain setting, the second gain setting, the third gain setting, the fourth gain setting and the a priori information.

8. The communication device of claim 7, in which the envelope detecting component includes a diode.

9. The communication device of claim 1,
    in which the transmitting component includes an analog transmitting system, and
    in which the receiving component includes an analog receiving system.

10. The communication device of claim 1, in which the envelope detecting component includes a diode.

11. A method comprising:
    generating, via a DC input component, a first direct current signal;

generating, via the DC input component, a second direct current signal;

generating, via a transmitting component including a transmitting amplifier, a first transmitted signal based on the first direct current signal;

generating, via the transmitting component, a second transmitted signal based on the second direct current signal;

generating, via an envelope detecting component, a first envelope signal based on the first transmitted signal;

generating, via the envelope detecting component, a second envelope signal based on the second transmitted signal;

generating, via a receiving component including a receiving amplifier, a first received signal based on the first envelope signal;

generating, via the receiving component, a second received signal based on the second envelope signal;

storing, into a storage component, a priori information; and outputting, via a comparator, a correlation signal based on the first received signal, the second received signal and a priori information.

12. The method of claim 11, including:
instructing, via a controlling component, the DC input component to generate the first direct current signal at a first time; and
instructing, via the controlling component, the DC input component to generate the second direct current signal at a second time.

13. The method of claim 12, including instructing, via the controlling component, the comparator to output the correlation signal at a third time.

14. The method of claim 13, in which generating, via a transmitting component including a transmitting amplifier, a first transmitted signal based on the first direct current signal includes generating the first transmitted signal via the transmitting component including a variable gain, differential power amplifier.

15. The method of claim 14, in which the generating, via a receiving component including a receiving amplifier, a first received signal based on the first envelope signal includes generating the first received signal via the receiving component including a variable gain amplifier.

16. The method of claim 15, including:
instructing, via the controlling component, the variable gain, differential power amplifier to change from a first gain setting to a second gain setting; and
instructing, via the controlling component, the variable gain amplifier to change from a third gain setting to a fourth gain setting.

17. The method of claim 16, in which the outputting, via a comparator, a correlation signal based on the first received signal, the second received signal and a priori information includes outputting the correlation signal based on the first gain setting, the second gain setting, the third gain setting, the fourth gain setting and the a priori information.

18. The method of claim 17, in which the generating, via an envelope detecting component, a first envelope signal based on the first transmitted signal includes generating the first envelope signal via the envelope detecting component comprising a diode.

19. The method of claim 11,
in which the generating, via a transmitting component including a transmitting amplifier, a first transmitted signal based on the first direct current signal includes generating the first transmitted signal via analog transmitting system, and
in which the generating, via a receiving component including a receiving amplifier, a first received signal based on the first envelope signal includes generating the first received signal via an analog receiving system.

20. The method of claim 11, in which the generating, via an envelope detecting component, a first envelope signal based on the first transmitted signal includes generating the first envelope signal via the envelope detecting component comprising a diode.

* * * * *